(12) United States Patent
Fanzutti et al.

(10) Patent No.: US 8,526,145 B2
(45) Date of Patent: Sep. 3, 2013

(54) POWER ON RESET GFCI

(75) Inventors: Robert F. Fanzutti, Naugatuck, CT (US); Gaetano Bonasia, Bronx, NY (US)

(73) Assignee: Hubbell Incorporated, Shelton, CT (US)

( * ) Notice: Subject to any disclaimer, the term of this patent is extended or adjusted under 35 U.S.C. 154(b) by 84 days.

(21) Appl. No.: 13/340,154

(22) Filed: Dec. 29, 2011

(65) Prior Publication Data

US 2013/0170083 A1 Jul. 4, 2013

(51) Int. Cl.
*H02H 9/08* (2006.01)

(52) U.S. Cl.
USPC .......................................................... 361/42

(58) Field of Classification Search
USPC .......................................................... 361/42
See application file for complete search history.

(56) References Cited

U.S. PATENT DOCUMENTS

| 7,154,277 | B2 | 12/2006 | Vallinmaki et al. |
| 7,362,551 | B2 | 4/2008 | Bax et al. |
| 7,372,678 | B2 | 5/2008 | DiSalvo et al. |
| 2006/0238931 | A1 | 10/2006 | Cline et al. |
| 2008/0013237 | A1 | 1/2008 | Moadel et al. |
| 2008/0144238 | A1 | 6/2008 | Cline et al. |
| 2008/0170341 | A1 | 7/2008 | Huang et al. |

*Primary Examiner* — Jared Fureman
*Assistant Examiner* — Kevin J Comber
(74) *Attorney, Agent, or Firm* — Kevin M. Barner; Mark S. Bicks; Alfred N. Goodman (57) ABSTRACT

A circuit interrupting device, such as a GFCI receptacle device, is provided that automatically resets itself when power is initially applied to the device, for example, when the device is first installed or when power is reapplied after a power outage occurs. When power is applied correctly to the line side of the device, as opposed to the load side, a voltage is generated that turns on a switching device. Turning on the switching device allows a low level of electric current to flow which, in turn, allows a higher level electric current to flow which closes the latching mechanism of the device and places the device in the reset condition.

20 Claims, 10 Drawing Sheets

POWER ON RESET GFCI

BACKGROUND OF THE INVENTION

1. Field of the Invention

The present invention relates to a GFCI device that automatically resets when it is properly wired and power is applied to the device. According to one embodiment, the present invention includes a GFCI device with a power-on reset circuit that directs an electric current through a circuit passing through a sense transformer to electrical ground to create a magnetic flux in the transformer upon power-up. A detector within the GFCI device detects this condition and outputs a signal to reset the device when the power-on reset circuit no longer provides enough current for the detector to detect the magnetic flux. A further embodiment of the present invention includes a microprocessor programmed to automatically reset the properly wired device each time power is applied to the device.

2. Description of Related Art

GFCI devices typically trip and prevent current from flowing from the line terminals to the load terminals in response to the detection of a ground fault condition at an AC load. For example, a ground fault condition can result when a person comes into contact with the hot conductor and earth ground at the same time, thus creating an alternative current path through the person, a situation that can result in serious injury or death. The GFCI device detects this condition with a sensing transformer that detects an imbalance between the currents flowing in the hot and neutral conductors of the AC supply, as will occur when some of the current on the hot conductor is diverted to ground and not returned on the neutral conductor. In most GFCI devices, when the detected imbalance exceeds a predetermined threshold, a mechanically latched circuit breaker within the GFCI device is immediately tripped to create an open circuit condition, thereby opening the hot and/or neutral conducting paths of the AC line and removing all power from the load. Many types of GFCI devices are capable of being tripped not only due to contact between the hot side of the AC load and ground, which is known as a ground fault, but also due to grounded neutral fault, which is caused by a connection between the neutral side of the AC load and ground. This latter type of fault, which may result from a defective load or from improper wiring, is potentially dangerous because it can prevent a conventional GFCI device from tripping due to a ground fault at the desired threshold level.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical GFCI receptacle includes test and reset push buttons and an incandescent lamp or light-emitting diode (LED), which indicates that the circuit is operating normally. When an actual ground fault occurs in the protected circuit, or when the test button is depressed, the GFCI device trips and an internal circuit breaker opens one or both sides of the AC line. The tripping of the internal circuit breaker causes the reset button to pop out and the LED to be extinguished, providing a visual indication that a ground fault has occurred. To reset the GFCI device, the reset button is depressed which closes and latches the circuit breaker, and which again illuminates the LED.

According to one known variety of GFCI devices, when power is initially applied, e.g., during installation, or reapplied, e.g., after a power failure/outage, to a properly wired device where AC power is connected to the line side of the device as opposed to the load side, a user must manually press the reset button to activate the GFCI device. Another type of known GFCI device will not trip when power is lost due to a power outage. According to this type of GFCI, the contacts stay connected during the outage and when power is restored to the device the GFCI device continues to provide power to the load, without the need to reset the device. A third type of GFCI device will automatically reset itself after it trips and power is present at the device.

Some previously known GFCI devices that reset automatically when power is restored to the device use a significant amount of power to implement and maintain the reset function. This is because the mechanism by which the reset condition is implemented and maintained, such as a solenoid or a relay device, requires that constant power be applied. Accordingly, there is a need for an improved GFCI device and method of operating the same where the device is automatically reset when the device is properly wired and the power required to operate and maintain the reset operation is reduced.

In addition to ground fault detection/protection, protection from miswiring is also needed. Specifically, as described above, GFCI receptacles may be erroneously connected with the incoming AC source conductors tied directly to the load or feedthrough terminals of the receptacle rather than to the line terminals. Because ground fault protection at the receptacle face terminals may not be provided under these conditions, additional measures must be taken to protect the user when such a miswire condition occurs.

To provide protection, a GFCI device must be able to remove line current from load connections when a ground fault is detected. Typically, a GFCI has two load connections or terminals. The load terminals, often in the form of screws, are connected to downstream receptacles, which are also provided with ground fault protection. Also, the face terminals of the GFCI device provide power and ground fault protection to an appliance plugged directly into the GFCI. The sensing transformer of the GFCI detects an imbalance between the current passing through the transformer on the hot conductor and the current returning on the neutral conductor. In a common configuration, the sensing transformer is placed between the line terminals and the circuit interrupter.

If a GFCI is miswired, that is, the line connections and the load connections are reversed, protection will only be supplied to downstream receptacles connected to the screw terminals. The face terminal, and any device connected thereto, will not be protected from ground faults because current must pass through the sense transformer for the imbalance in current to be detected. Accordingly, when a GFCI is miswired, current will flow from the incorrectly wired load terminals to the face terminals without passing through the sense transformer.

In one approach for addressing the above-described issues, a GFCI employs a miswire plate, which is latched before the GFCI leaves the factory. Upon proper installation and power up, current is passed directly through the solenoid without passing through the sensing transformer. The solenoid fires and the miswire plate is unlatched. However, when the miswire plate is unlatched it is no longer in the circuit and no longer provides miswire protection.

According to this approach, the miswire circuit does not subsequently test if the device is wired correctly. That is, if the GFCI device is removed from the wall and installed in a new location, the installer does not know whether the device was reinstalled correctly or miswired. If the device is miswired when re-installed, the face terminal would not have ground fault protection.

In another approach that has been considered, a GFCI is tested for proper wiring by manually pressing a test button and then manually pressing a reset button on the GFCI. If working properly, pressing the test button causes the GFCI to trip mechanically. When the reset button is pressed, it actuates a switch that provides a ground fault to the device, which causes the GFCI to fire a solenoid. If the solenoid does not fire, the reset button will not latch due to the GFCI being miswired.

One drawback to this approach is that it requires the user to manually press both the test and reset button in order to test if the GFCI has been installed correctly. Accordingly, there is a need for an improved method and device for automatically testing whether a GFCI is properly wired each time power is applied to the device and for automatically resetting the device if the device is properly wired.

SUMMARY OF THE INVENTION

Aspects of exemplary embodiments of the present invention provide a power-on reset GFCI circuit that automatically resets the device when power is applied to the device.

According to one exemplary embodiment a GFCI device is provided that includes a core GFCI circuit for detecting a net current flowing in one or more of a sense transformer and a grounded neutral transformer. A latching mechanism is coupled to the GFCI circuit for connecting or isolating the line and load terminals of the GFCI device depending on the status of the core GFCI circuit and a power-on reset circuit is coupled to the latching mechanism. The power-on reset circuit produces a relatively small net current in the sense transformer when the GFCI device is first powered, such as when the device is installed, or when power is reapplied to the device after AC power to the device has been suspended. A solenoid pull-in circuit is also coupled to the latching mechanism and draws a current significantly larger than the small current drawn by the power-on reset circuit when the core GFCI circuit detects a condition requiring the latching mechanism to close. Additionally, a solenoid holding circuit is coupled to the latching mechanism for maintaining the latching mechanism in the closed stated after it is closed by the solenoid pull-in circuit. The solenoid holding circuit draws less current to keep the latch closed than the pull-in circuit draws to close it and, thus, overall power usage is reduced over a device where the same circuit is used for both functions, i.e., closing the latch and keeping it closed.

A power-on indicator circuit and an end-of-life indicator circuit are also provided in accordance with this embodiment. The power-on indicator is electrically coupled to the load, or output, terminals and indicates when AC power is available at the load terminals. The end-of life indicator circuit is coupled between the test button and the load terminals and indicates when one or more conditions are present that render the GFCI inoperative or at least unsafe, such as if the latching mechanism fails to open when a test ground fault is generated.

According to a further exemplary embodiment of the invention a circuit interrupting device is provided that automatically resets itself when power is first applied to the AC input terminals of the device after installation, or when power is first reapplied to the AC input terminals of the device after power has been off, such as when a power outage occurs. A device according to this embodiment includes, among other things, first and second input terminals adapted to connect to line and neutral sides, respectively, of an AC power source, and first and second output terminals. The output terminals of the device include one or more of screws terminals and push-in contact terminals to which wires can be connected for attaching to downstream electrical receptacles. The device according to this exemplary embodiment also includes a first conductive path that extends between the first input terminal and the first output terminal, a second conductive path that extends between the second input terminal and the second output terminal, and a third conductive path that is independent from the first and second conductive paths. The third conductive path passes through a sense transformer and a power-on reset circuit directs an electrical current on the third conductive path when AC power is applied to the input terminals. When the electrical current is present on the third conductive path and a net current is produced, a sensing circuit generates a fault detection signal. When the fault detection signal is generated, a latching mechanism closes and the first and second conductive paths are electrically connected. A holding circuit then maintains the latching mechanism in the closed state.

According to a further aspect of the above embodiment, the power-on reset circuit enables current to flow through the third conductive path until the AC power reaches a predetermined threshold. For example, a zener diode is provided in the power-on reset circuit and once the AC voltage reaches the threshold voltage of the zener diode, current stops flowing on the third conductive path. A charge storing device, such as a capacitor, in the power-on reset circuit stores an electrical charge when current is flowing through the third conductive path and then it discharges the stored electrical charge when current stops flowing through the third conductive path.

According to a further aspect of the invention the circuit interrupting device in accordance with the above embodiment further includes a pull-in circuit that is electrically connected to a solenoid. The pull-in circuit activates the solenoid when the AC power reaches the predetermined threshold. A plunger in the solenoid is mechanically engaged with one or more contact structures in the latching mechanism and pulls the contact structures together to place the device into a reset condition.

The latching mechanism according to the embodiment includes a face electrical contact electrically connected to a face receptacle terminal, a line electrical contact electrically connected to one of the first and second input terminals and a load electrical contact electrically connected to one of the first and second output terminals. Also, the face, line and load contacts are electrically connected to each other when the latching mechanism is in the closed state and the face, line and load contacts are electrically isolated when the latching mechanism is in an open state.

A permanent magnet is also provided in accordance with the present embodiment for biasing the face electrical contact away from the line and load electrical contacts with a magnetic force. For example, the permanent magnet can be attached to the ground bridge and exert a magnetic force on the face contact structure to hold it away from the line and load contact structures until the magnetic force is overcome. For example, according to the present embodiment, the solenoid, or more particularly, the plunger of the solenoid, generates a force greater than the magnetic force of the permanent magnet and biases the face electrical contact towards the line and load electrical contacts when the solenoid is activated.

According to another embodiment of the invention a circuit interrupting device is provided that includes hot and neutral line terminals adapted to electrically connect to a source of AC power, hot and neutral load terminals adapted to electrically connect to a remote electrical load and hot and neutral face terminals adapted to electrically connect to a user accessory. When the circuit interrupting device is in a reset condition the hot line, load and face terminals are electrically connected to each other and the neutral line, load and face terminals are, similarly, electrically connected to each other. When the circuit interrupting device is in a tripped condition, the hot line, load and face terminals are electrically isolated and the neutral line, load and face terminals are electrically isolated. Further, the circuit interrupting device is automatically placed into the reset condition when the circuit interrupting device is initially in the tripped condition and AC power is applied to the line terminals.

According to a further aspect of this additional embodiment, the circuit interrupting device also includes a sense transformer adapted to indicate when a net current is flowing through the sense transformer, a first conductive path disposed through the sense transformer and electrically connecting the hot line terminal to the hot load and face terminals when the circuit interrupting device is in the reset condition, and a second conductive path disposed through the sense transformer and electrically connecting the neutral line terminal to the neutral load and face terminals when the circuit interrupting device is in the reset condition. Further, a power-on reset circuit is provided that includes a third conductive path electrically isolated from the first and second conductive paths and is disposed through the sense transformer, and the power-on reset circuit is adapted to direct a reset electrical current on the third conductive path when the power-on reset circuit is activated. A control device activates the power-on reset circuit when AC power is applied to one or more of the hot and neutral line terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings.

Throughout the drawings, like reference numerals will be understood to refer to like parts, components, and structures.

DETAILED DESCRIPTION OF EXEMPLARY EMBODIMENTS

The matters disclosed in the following description, such as the exemplary construction of various embodiments and elements therefor are provided to assist in a comprehensive understanding of the embodiments of the invention. Those of ordinary skill in the art will recognize that various changes and modifications to the embodiments described herein can be made without departing from the scope and spirit of the invention. Also, descriptions of well-known functions and constructions are omitted for clarity and conciseness.

An object of at least one exemplary embodiment is to automatically reset a GFCI each time power is applied to a properly wired device. Particularly, exemplary embodiments of the present invention include a GFCI utilizing an electronic circuit that, upon power-up, provides a net current through a sense transformer via a dedicated conductive path to ground, which triggers an output signal to automatically reset the circuit. According to a further exemplary embodiment of the present invention, a microprocessor programmed to automatically undergo a power-on routine that tests and resets the device each time power is applied to the properly wired device is disclosed.

Figure 1:
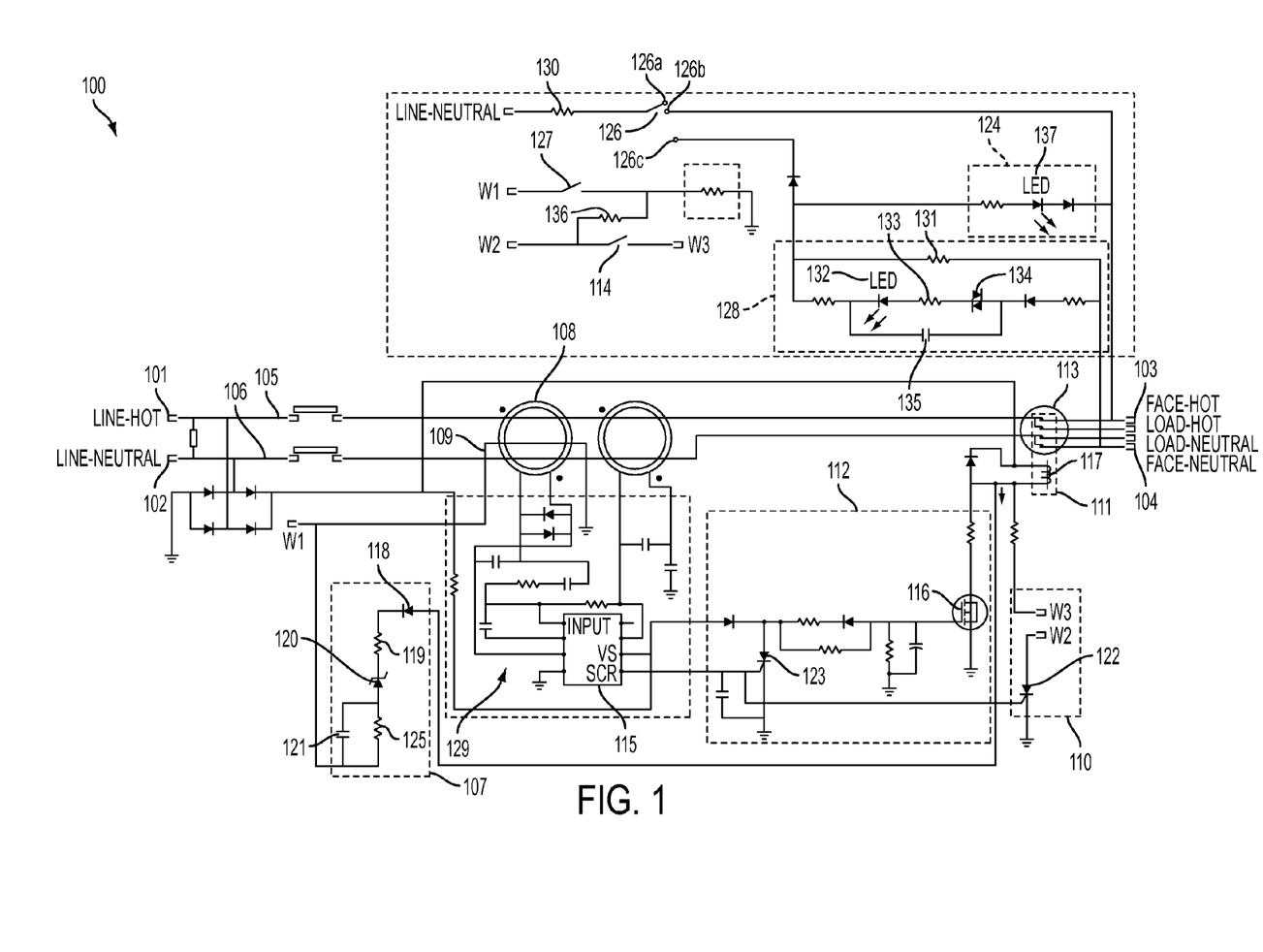
FIG. 1 is a schematic diagram depicting a Power-On Reset GFCI in accordance with one embodiment of the invention.

Referring to FIG. 1, an exemplary schematic according to an embodiment of the present invention is discussed in detail below. According to the schematic in FIG. 1 a GFCI device 100 is automatically reset when power is applied to the device and the device is properly wired.

First and second input terminals, 101, 102 are provided on the line, or AC input, side of the device and connect to the hot and neutral conductors, respectively, of an AC power source. First and second output terminals, 103, 104 represent the hot and neutral output face terminals, respectively, of the device. First and second conductive paths 105, 106 extend, respectively, between the first input terminal 101 and the first output terminal 103 and between the second input terminal 102 and the second output terminal 104. Also shown in the schematic of FIG. 1 are the hot and neutral load side terminals (LOAD-HOT, LOAD-NEUTRAL) of the device.

Power-on reset circuit 107 establishes, upon power up of GFCI 100, a net current flowing through sense transformer 108, via third conductive path 109, independently from first and second conductors 105, 106. Sensing circuit 129 outputs a fault detection signal in response to a net current flowing through sense transformer 108 when the net current exceeds a given threshold. Even though under these conditions there is no actual fault present, the signal is referred to as a "fault" detection signal because it is created on the same output of the sensing circuit 129 where a fault detection signal would be created if a genuine fault were present, such as a ground fault or a grounded neutral fault.

The net current threshold at which a fault detection signal is generated is determined by the design of the sensing circuit. According to the present embodiment this threshold is dictated by Underwriters Laboratory (UL) requirements and is currently set to be in the range of 4-6 milliamps. That is, sensing circuit 129 will output the detection signal when the total net current through transformer 108 exceeds the threshold, regardless of whether the net current is created by a current present on line 109, line 105, line 106, or a combination of any of these lines. Pull-in circuit 110 closes latching mechanism 111 establishing electrical contact between the line, face and load terminals in response to the fault detection signal. Holding circuit 112 then maintains latching mechanism 111 in a closed state.

Upon Power-Up

Prior to the initial application of power to GFCI device 100, the contacts within main contact assembly 113 are open and pull-in circuit switch 114 is closed.

Upon power-up of GFCI 100, that is, when AC power is initially applied to the line terminals 101, 102 after the device is installed or when AC power is reapplied to these terminals after a power outage or a transient fault, integrated circuit (IC) 115, which according to one embodiment is an RV4141 GFCI chip by Fairchild Semiconductor, is also powered up. When IC 115 is powered, its voltage supply output (VS) provides a voltage which activates the gate of MOSFET transistor 116 through solenoid holding circuit 112.

Once MOSFET 116 is turned ON, it controls a low level current (~100 mA) to flow along a path from IC 115 through solenoid 117 and MOSFET 116 to ground. This low level current, however, does not exceed the threshold required to trigger solenoid 117; that is, with the low level current flowing through solenoid 117, the plunger within solenoid 117 does not move. Thus, the contacts within main contact assembly 113 remain open.

A leakage current (~5 mA, or more), derived from the low level current passing through solenoid 117, is diverted via third conductive path 109 through power-on reset circuit 107. This leakage current is directed into power-on reset circuit 107 by diode 118. As the voltage at zener diode 120 approaches the zener voltage of the diode, also referred to as the breakdown voltage, the current flows through resistor 119, which limits the current flowing through power-on circuit 107 based on its value, through zener diode 120 and capacitor 121. Capacitor 121 charges and current flows through third conductive path 109 and through sense transformer 108 to ground.

Sensing circuit 129 senses the net current flowing through sense transformer 108 and provides an input signal to IC 115 to indicate this condition. IC 115, in turn, sets its SCR output to gate SCR1 (122) and SCR2 (123) ON. Thus, SCR 2 (123) now conducts and removes the power from the gate of MOSFET transistor 116, turning it OFF. Also, because pull-in switch 114 is closed, SCR1 (122) now conducts and pulls a high current (~1 Amp) through solenoid pull-in circuit 110, thus, activating latch mechanism 111 to close, thus resetting the device. As solenoid pull-in circuit 107 conducts and pulls-in the plunger to close the latch 111, pull-in switch 114 opens and connections W2, W3 in the pull-in circuit 110 become disconnected.

Further, because capacitor 121 of the power on reset circuit 107 is now fully charged, less than 0.1 mA of trickle current passes through the power on reset circuit and through differential sensing transformer 108 on third conductive path 109. This small trickle current on conductive path 109 is not enough to keep the SCR gate output of IC 115 activated. Accordingly, the SCR gate output of IC 115 turns OFF and SCR1 (122) and SCR2 (123) stop conducting. Because pull-in switch 114 is open and SCR1 (122) is not gated ON, the high current (~1 Amp) stops flowing through solenoid 117.

When the SCR output of IC 115 turns OFF, however, the gate for SCR 2 (123) is deactivated and SCR2 (123) no longer shorts power from MOSFET transistor 116. Specifically, when SCR2 (123) turns OFF, the voltage from the VS output of IC 115 gates MOSFET transistor 116 ON. Hence, MOSFET 116 directs a low level current (~100 mA) through solenoid 117. Since solenoid 117 is already pulled-in, this amount of low current is enough to keep solenoid 117 activated and contact assembly 113 latched.

At any time power is removed, for example, by un-installing the device, power loss via breaker being tripped, or blackout or brown-out, resistor 125, of power-on reset circuit 107, discharges capacitor 121 such that, when power returns, power on reset circuit 107 will again operate as described above.

Test Button Pressed

When test button 126 of GCFI 100 is pressed, a test current equal to the current required for an actual ground fault is established through transformer 108 on first conductive path 105. Specifically, when test button 126 is pressed and first test button contact 126a contacts second test button contact 126b, the neutral-line terminal 102 is electrically connected to the hot-face terminal 103 through resistor 130. Accordingly, a portion of the total current on second conductive path 106 bypasses transformer 108 through resistor 130 returns back through transformer 108 on first conductive path 105. Circuit 129 senses the net current flowing through sense transformer 108 on first conductive path 105 and provides an input signal to IC 115, which sets the SCR output pin to high, gating SCRs 122, 123 ON. SCR 2 (123) then shorts power to MOSFET transistor 116. However, no current flows through SCR 1 (122) because pull-in circuit switch 114 is in the open position. Because no current flows through solenoid 117, latching mechanism 111 releases, thereby, opening the contacts of main contact assembly 113 and turning power-on indicator 124 OFF. Also, when contact assembly opens, pull-in switch 114 closes.

At this point, sensing circuit 129 no longer senses a net current flow through sense transformer 108 and the SCR output of IC 115 goes low. Accordingly, SCR 2 (123) turns off, thus, gating MOSFET transistor 116 ON. MOSFET transistor 116 draws a low level current (~100 mA) through solenoid 117, but not enough current for solenoid 117 to activate latch mechanism 111. Pull-in circuit switch 114 is now closed and ready for reset but no current flows through SCR1 (122) because SCR gate output from IC 115 is turned OFF.

If, however, when test button 126 is pressed and first and second test button contacts 126a and 126b, respectively, contact each other and the contacts in main contact assembly 113 do not open, end-of-life indicator 128 activates. For example, a red LED flashes or blinks to indicate an end-of-life condition for GFCI device 100. Specifically, according to this embodiment, continued pressing of test button 126 results in first test button contact 126a making electrical contact with third test button contact 126c. That is, the connection between contacts 126a and 126b breaks and a connection between contacts 126a and 126c is established. Current now flows through end-of-life indicator circuit 128. When current is permitted to flow through end-of-life circuit 128, fuse 131 blows initially and then current flows through the indicator circuit including LED 132, resistor 133 and diac 134, and LED 132, for example a red LED, illuminates. Further, the continuous charging and discharging of optional capacitor 135 causes LED 132 to blink, drawing further attention to the user that the GFCI device has reached the end of its useful life, as determined by the failure of the contact assembly 113 to open when test button 126 is pressed.

Reset Button Pressed

Prior to resetting the GFCI device 100, the contacts within main contact assembly 113 are open and pull-in circuit switch 114 is closed. MOSFET 116 enables a low level current (~100 mA) to flow along a path from IC 115 through solenoid 117 to ground. As mentioned above, this low level current does not exceed the threshold required to trigger solenoid 117. Thus, the contacts within main contact assembly 113 remain open.

When reset button 127 of GFCI 100 is pressed, a current (~5 mA, or more), derived from the low level current passing through solenoid 117, is drawn through resistor 136 (from point W3 to W1 in FIG. 1) and then through differential sensing transformer 108 to ground via conductive path 109. Sensing circuit 129 senses the net current flow through sense transformer 108 and IC 115 sets its SCR output to high, gating SCRs 1 and 2, (122, 123) ON. As a result, SCR 2 (123) shorts power to MOSFET transistor 116. Because pull-in circuit switch 114 is closed and SCR1 (122) is now gated, SCR1 (122) is activated and directs a high level current (~1 Amp) to flow through solenoid pull-in circuit 110, which triggers latch mechanism 111 by pulling the high current through solenoid 117. Accordingly, contact assembly 113 of latch mechanism 111 closes and activates power-on indicator 124, which includes LED 137, for example, a green LED. Solenoid pull-in circuit 110 opens pull-in switch 114, which turns OFF SCR1 (122) by cutting off the current supply to SCR 1 (122). IC 115 SCR output turns OFF, thus, deactivating SCR 2 (123), and gates the MOSFET transistor 116 ON. MOSFET 116 controls a low level current (~100 mA) through solenoid 117. Because the plunger of solenoid 117 is now pulled-in, this low amount of current is enough to keep solenoid 117 activated and contact assembly 113 latched.

Latching Mechanism

Figure 2:
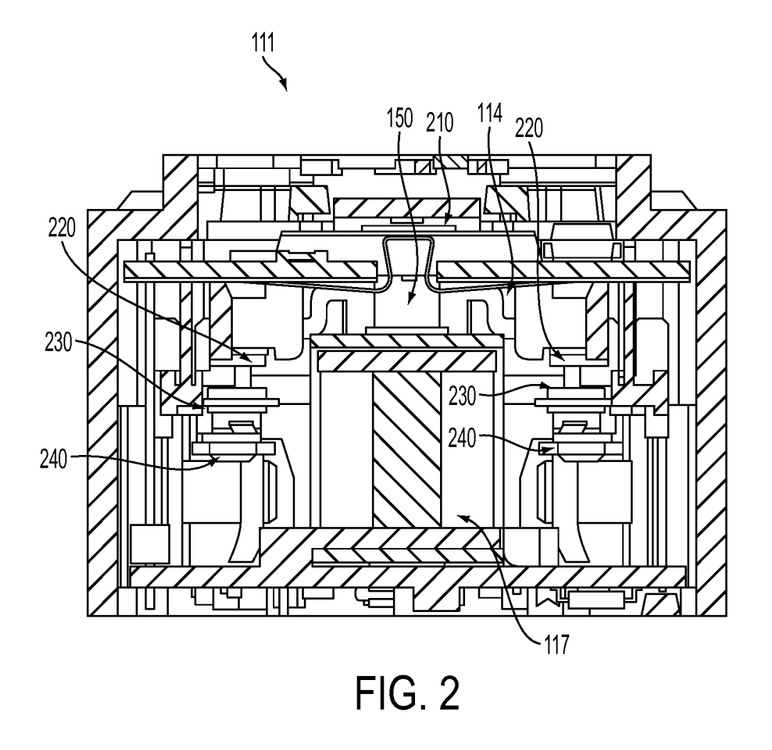
FIGS. 2-6 are detailed cross-sectional views showing components of the latching mechanism of a GFCI device according to one embodiment of the invention in progressive states during the reset operation.

FIGS. 2-9 are cross-sectional views showing mechanical components of latching mechanism 111 according to one exemplary embodiment. Specifically, the figures show the relative positions of various components in progressive states during the reset, test and ground fault detection operations of a GFCI device in accordance with the embodiment of the invention. As shown in FIG. 2, latching mechanism 111 includes permanent magnet 210, pull-in circuit switch 114, solenoid 117, and the main contact assembly 113, which includes two face load contacts 220, two downstream load contacts 230, and two line contacts 240. Also shown in FIG. 2 is plunger 150 which mechanically closes the contact assembly when solenoid 117 is energized.

Figure 3:
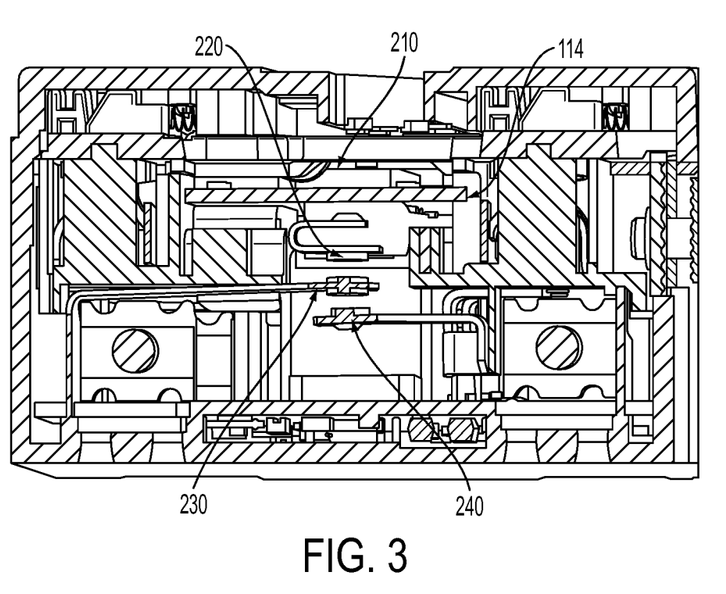

Referring to FIG. 3, which is a side view of the latching mechanism 111 shown in FIG. 2, pull-in circuit switch 114, which can include, for example, two electrical contacts that are electrically connected when the GFCI device is in the tripped condition and electrically disconnected when the device is reset, is closed and latching mechanism 111 is ready to be reset. The contacts of the main contact assembly are in an open position due to permanent magnet 210 holding face load contacts 220 open, i.e., in the up direction away from the line and load contacts, 240, 230, respectively.

Figure 4:
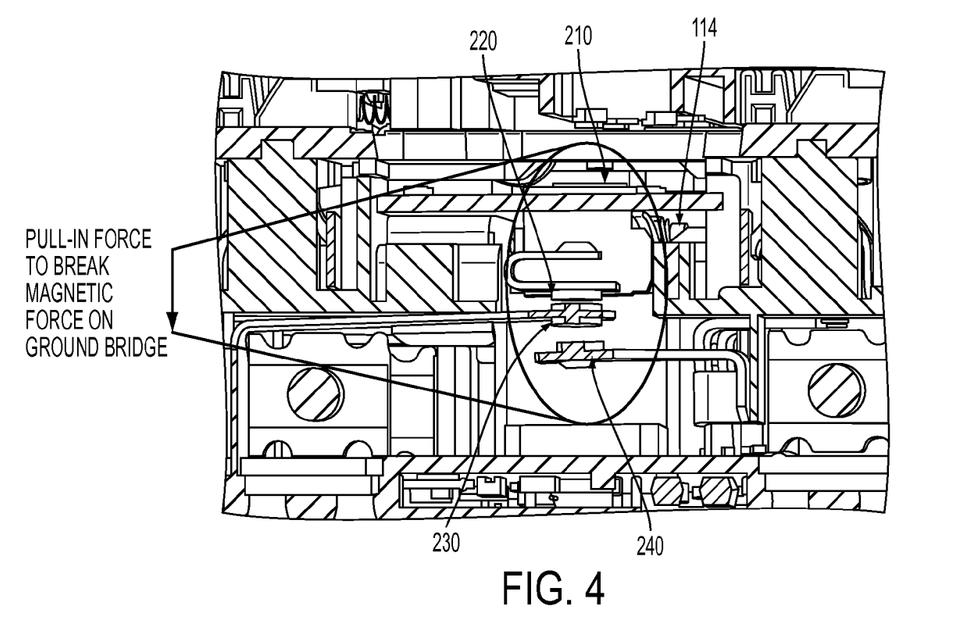

Referring to FIG. 4, reset button 127 (FIG. 1) has been pressed resulting in current flowing through solenoid 117, as described above, and a pull-in force on plunger 150 overcomes the magnetic force created by permanent magnet 210 located on the ground bridge. This causes face load contacts 220 to move in the downward direction towards downstream load contacts 230. Pull-in circuit switch 114 remains closed at this point.

Figure 5:
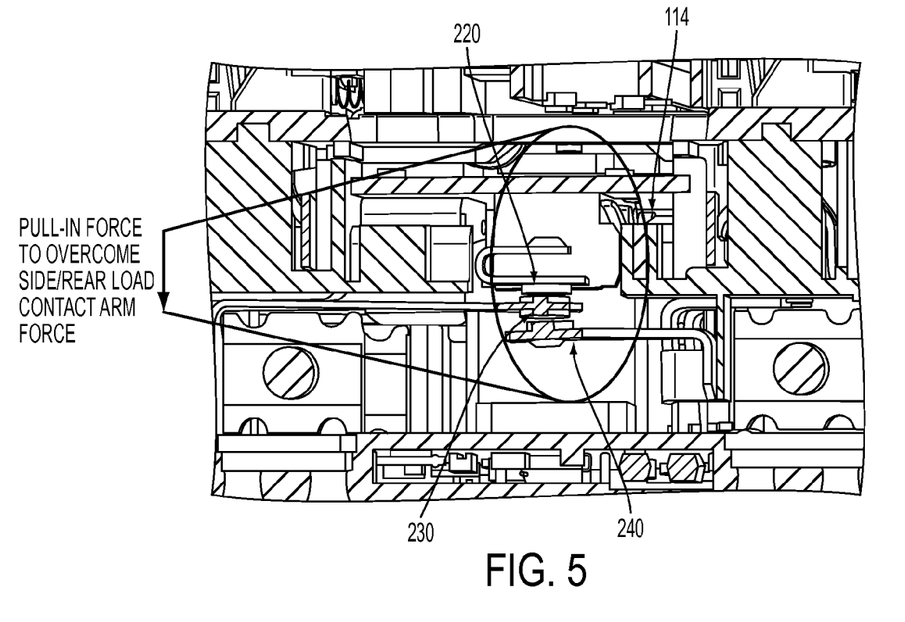

Referring to FIG. 5, the pull-in force generated by solenoid 117 continues to overcome the magnetic force created by permanent magnet 210, causing face load contacts 220 and downstream load contacts 230 to move in the downward direction towards line contacts 240, and pull-in circuit switch 114 opens. The GFCI is now reset and power is available to the load because current can now flow from line contacts 240 to face load contacts 220 and load contacts 230.

Figure 6:
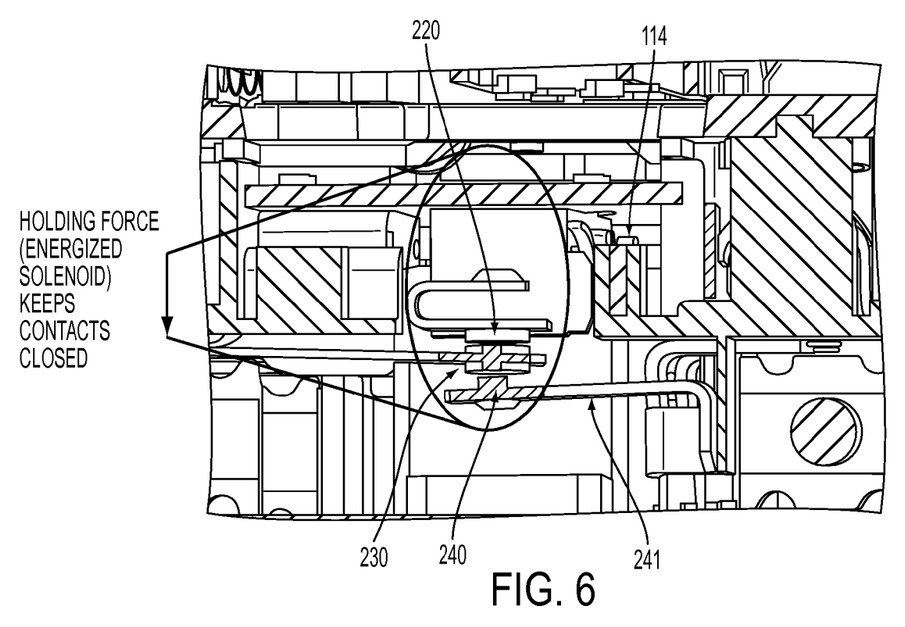

Referring to FIG. 6, a holding force generated by energized solenoid 117 keeps the contacts of the main contact assembly 113 closed, thus maintaining power to the load. That is, as described above in regard to FIG. 1, holding circuit 112 maintains a current through solenoid 117 to keep the contacts 220, 230 and 240, closed. Also shown in FIG. 6, line contact arm 241 is flexible to provide over travel to maintain good contact between the line contacts 240 and the load contacts 230.

Figure 7:
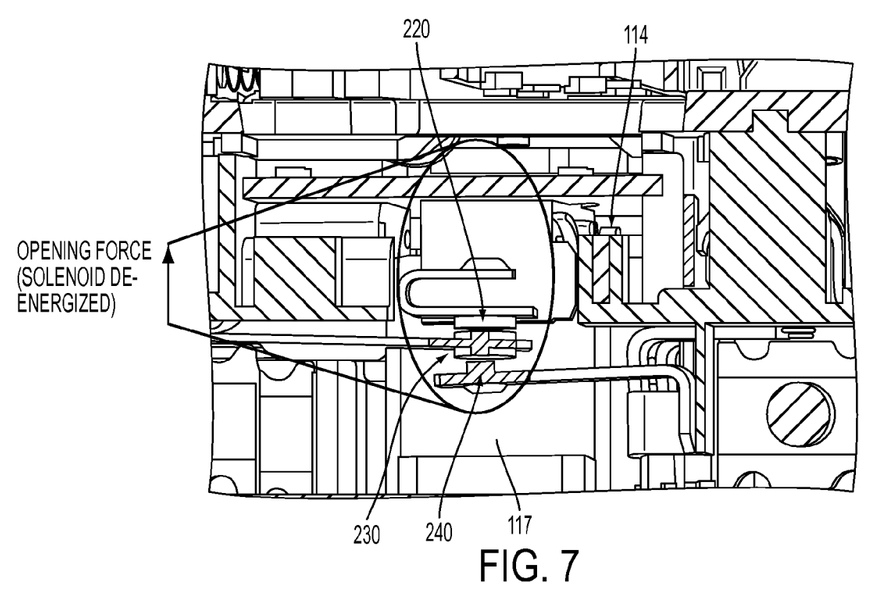
FIGS. 7-9 are detailed cross-sectional views showing components of the latching mechanism of a GFCI device according to one embodiment of the invention in progressive states during the test and ground fault operations.

FIG. 7 shows the latching mechanism 111 when a fault occurs or when test button 126 has been pressed. As described above in regard to FIG. 1, when this occurs, solenoid 117 de-energizes, thus creating a magnetic (upward) force created by permanent magnet 210. This causes face load contacts 220, downstream load contacts 230 and line contacts 240 to open and return to their natural, tripped, position, as shown in FIG. 9.

Figure 8:
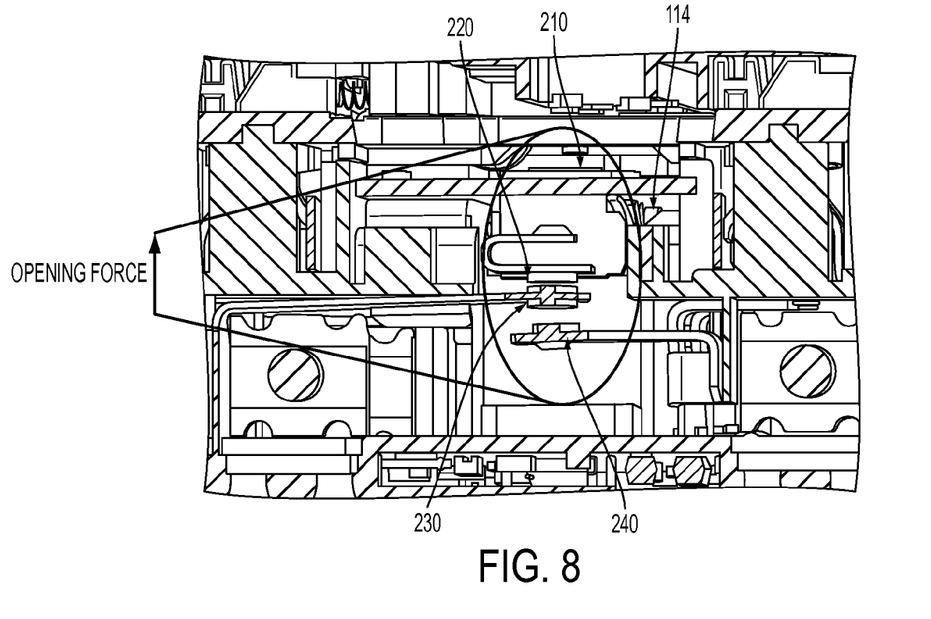

Referring to FIG. 8, permanent magnet 210 creates a magnetic force, causing face load contact 220 to move in an upwards direction. The upward movement of face load contact 220 causes downstream load contact 230 and line contact 240 to open, thus removing power from the load.

Figure 9:
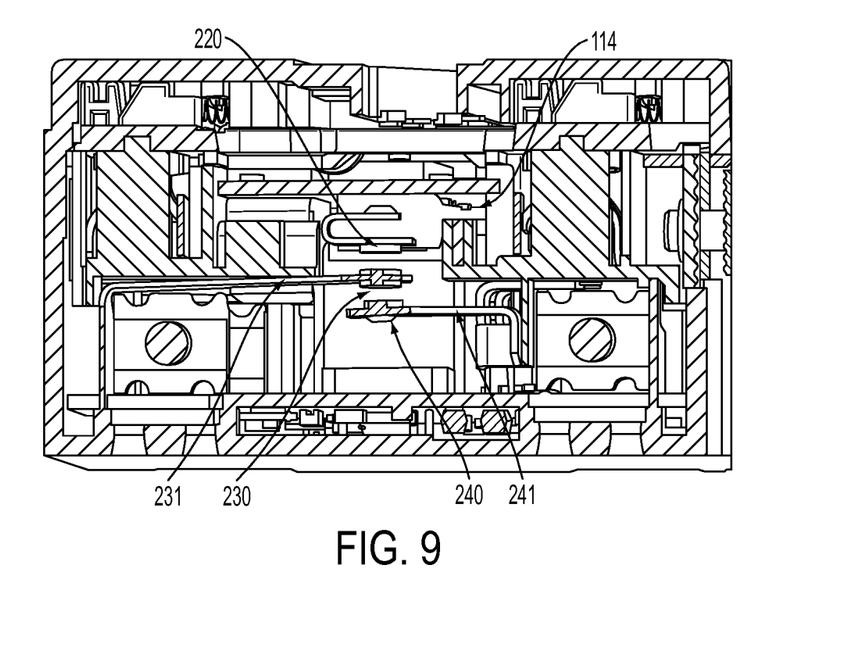

Referring to FIG. 9, the magnetic force created by permanent magnet 210 continues to move the face load contact 220 in an upward direction, causing face load contact 220 and downstream load contact 230 to open. The contacts of main contact assembly 113 are now in the open position with permanent magnet 210 holding face load contact 220 in the upward position. The natural bias of line contact arm 241 and load contact arm 231, which carry the line and load contacts 240 and 230, respectively, maintains the latching mechanism in the open position when face load contacts are being held open (upward in FIG. 9) by magnet 210. Switch 114 closes when face load contact 220 is held by magnet 210 and latching mechanism 111 is ready to be reset.

Power-On Reset Microprocessor

Figure 10:
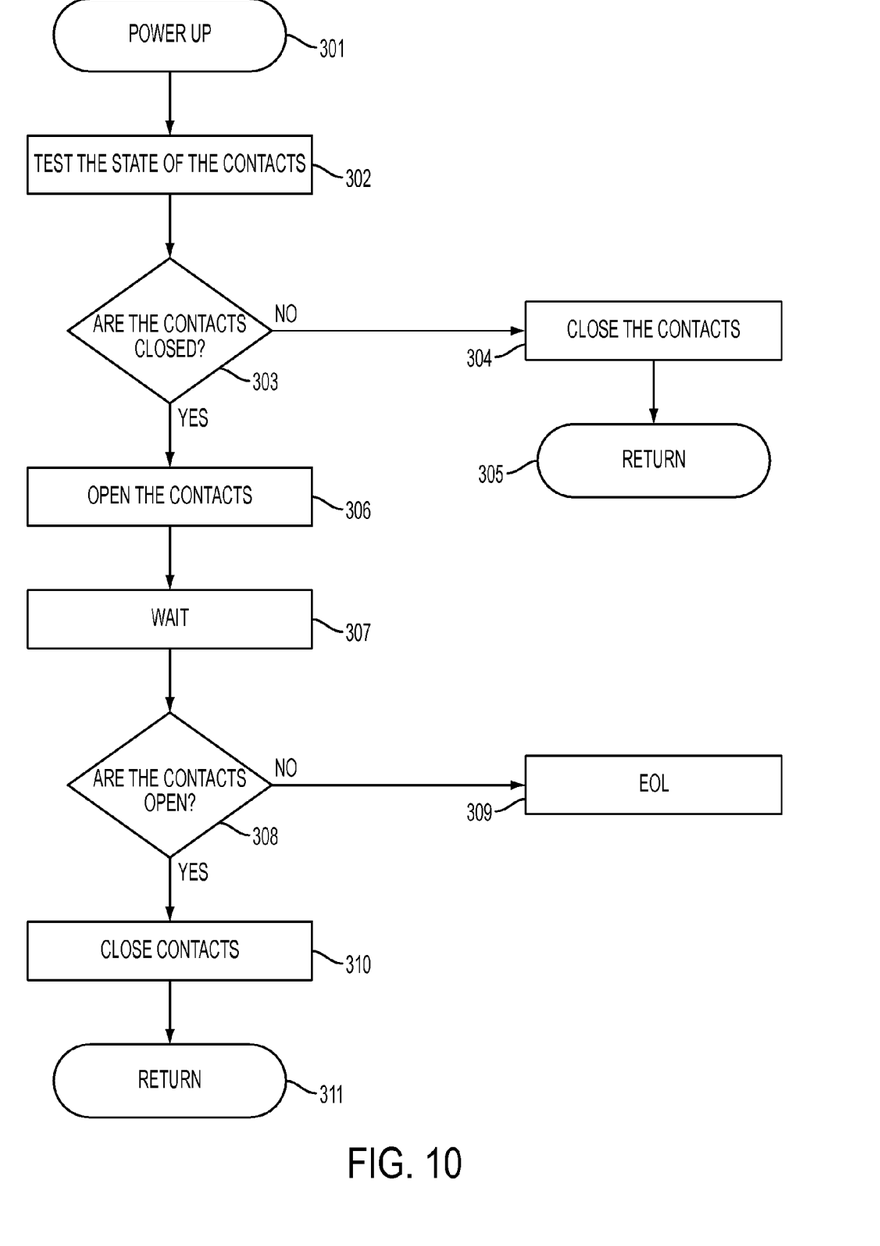
FIG. 10 is a flowchart illustrating a method for automatically resetting a properly wired GFCI device upon power up according to an exemplary embodiment of the present invention.

Referring to FIG. 10, an further exemplary embodiment of a method in accordance with the invention incorporates a microprocessor that is powered from the line side of the GFCI device. The microprocessor is programmed to undergo a power-on routine that begins a testing process each time power is applied to the device, as shown in step 301. The microprocessor is programmed to open, pause, and then close the contacts of the contact assembly each time the microprocessor is powered up.

If the device was properly wired with AC power connected to the line side terminals, the microprocessor is powered. The microprocessor then tests the contact assembly state at steps 302, 303 and either (1) closes the contacts of the contact assembly if it was initially open as shown in step 304, or (2) opens, pauses, then closes the contacts of the contact assembly if it was initially closed, as shown in steps 306, 307, 308, 310.

If, however, the device is improperly wired with AC power connected to the load side terminals, then the device will operate in one of two ways depending on the initial state of the contact assembly. If the contacts of the contact assembly are initially closed, the microprocessor is powered and will open the contacts of the contact assembly according to the start-up routine as shown in step 306. Once the contacts of the contact assembly are open, however, the microprocessor will lose power and cannot continue the start-up routine to close the contacts of the contact assembly.

If the contacts of the contact assembly are initially open and the device is miswired, the microprocessor will not be powered and cannot run the start-up routine until the device is properly wired. Thus, the contacts of the contact assembly will not close and will remain open.

Because the microprocessor start-up routine runs each time the device is powered up, the power-on routine will have to pass each time the device is installed and each time power is applied to the device, or reapplied, such as after a power outage.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A circuit interrupting device that automatically resets itself upon power up, comprising:
   first and second input terminals adapted to connect to line and neutral sides, respectively, of an AC power source;
   first and second output terminals;
   a first conductive path extending between said first input terminal and said first output terminal;
   a second conductive path extending between said second input terminal and said second output terminal;
   a third conductive path independent from said first and second conductive paths and passing through a sense transformer;
   a power-on reset circuit adapted to direct an electrical current on said third conductive path when AC power is applied to said input terminals;
   a sensing circuit adapted to generate a fault detection signal in response to a net electrical current flowing through said sense transformer;
   a latching mechanism that closes in response to generation of the fault detection signal, wherein said first and second conductive paths are electrically connected when said latching mechanism is in a closed state; and
   a holding circuit adapted to maintain the latching mechanism in the closed state.

2. A circuit interrupting device in accordance with claim 1, wherein said power-on reset circuit permits current to flow through said third conductive path until the AC power reaches a predetermined threshold.

3. A circuit interrupting device in accordance with claim 2, wherein said power-on reset circuit includes a switching device and the predetermined threshold is determined by a parameter associated with said switching device.

4. A circuit interrupting device in accordance with claim 3, wherein said power-on reset circuit further includes a charge storing device that stores an electrical charge when current is flowing through said third conductive path and discharges the stored electrical charge when current stops flowing through said third conductive path.

5. A circuit interrupting device in accordance with claim 1, further comprising a solenoid adapted to close said latching mechanism when said solenoid is activated.

6. A circuit interrupting device in accordance with claim 5, further comprising a pull-in circuit electrically connected to said solenoid and adapted to activate said solenoid when the AC power reaches the predetermined threshold.

7. A circuit interrupting device in accordance with claim 6, wherein said latching mechanism includes a face electrical contact electrically connected to a face receptacle terminal, a line electrical contact electrically connected to one of said first and second input terminals and a load electrical contact electrically connected to one of said first and second output terminals, wherein said face, line and load contacts are electrically connected to each other when said latching mechanism is in the closed state and said face, line and load contacts are electrically isolated when said latching mechanism is in an open state.

8. A circuit interrupting device in accordance with claim 7, further comprising a permanent magnet adapted to bias said face electrical contact away from said line and load electrical contacts with a magnetic force.

9. A circuit interrupting device in accordance with claim 8, wherein said solenoid generates a force greater than the magnetic force and biases said face electrical contact towards said line and load electrical contacts when said solenoid is activated.

10. A circuit interrupting device comprising:
    hot and neutral line terminals adapted to electrically connect to a source of AC power;
    hot and neutral load terminals adapted to electrically connect to a remote electrical load;
    hot and neutral face terminals adapted to electrically connect to a user accessory, said hot line, load and face terminals being electrically connected to each other, and said neutral line, load and face terminals being electrically connected to each other when said circuit interrupting device is in a reset condition, and said hot line, load and face terminals being electrically isolated, and said neutral line, load and face terminals being electrically isolated when said circuit interrupting device is in a tripped condition, wherein said circuit interrupting device is automatically placed into the reset condition when said circuit interrupting device is initially in the tripped condition and AC power is applied to said line terminal.

11. A circuit interrupting device in accordance with claim 10, further comprising a sense transformer adapted to indicate when a net current is flowing through said sense transformer;
    a first conductive path disposed through said sense transformer and electrically connecting the hot line terminal to said hot load and face terminals when said circuit interrupting device is in the reset condition;
    a second conductive path disposed through said sense transformer and electrically connecting the neutral line terminal to said neutral load and face terminals when said circuit interrupting device is in the reset condition;
    a power-on reset circuit including a third conductive path electrically isolated from said first and second conductive paths and disposed through said sense transformer, said power-on reset circuit being adapted to direct a reset electrical current on the third conductive path when said power-on reset circuit is activated;
    a control device adapted to activate said power-on reset circuit when AC power is applied to one or more of said hot and neutral line terminals.

12. A circuit interrupting device in accordance with claim 11, further comprising
    a latching mechanism connected to said hot and neutral line, and load and face terminals, wherein said latching mechanism is closed when said circuit interrupting device is in the reset condition, and said latching mechanism is open when said circuit interrupting device is in the tripped condition; and
    a solenoid adapted to close said latching mechanism when an activation current greater than a predetermined threshold is permitted to flow through said solenoid.

13. A circuit interrupting device in accordance with claim 12, wherein said control device permits a low level current to flow through said solenoid when AC power is applied to one or more of said hot and neutral line terminals, said low level current being less than the activation current.

14. A circuit interrupting device in accordance with claim 13, wherein the activation current is at least twice as large as the low level current.

15. A circuit interrupting device in accordance with claim 10, further comprising
    a power-on indicator adapted to indicate when AC power is properly applied to said hot and neutral line terminals; and an end of life indicator adapted to indicate when said circuit interrupting device can no longer enter the tripped state.

16. A circuit interrupting device in accordance with claim 13, further comprising
a pull-in circuit adapted to permit the activation current to flow through said solenoid; and
a holding circuit adapted to permit the activation current to flow through said solenoid.

17. A circuit interrupting device in accordance with claim 10, further comprising
a latching mechanism connected to said hot and neutral line, and load and face terminals, wherein said latching mechanism is closed when said circuit interrupting device is in the reset condition, and said latching mechanism is open when said circuit interrupting device is in the tripped condition; and
a microcontroller adapted to run a power-on routine when AC power is first applied to, or reapplied after being removed from, said hot and neutral line terminals, the power-on routine including checking whether said latching mechanism is closed or open, and closing said latching mechanism if it is open, and opening said latching mechanism if it is closed and declaring and end of life condition if the latching mechanism does not open.

18. A method of operation of a circuit interrupting device comprising the steps of:
applying power to the line side of the circuit interrupting device,
activating a GFCI circuit upon application of AC power to the line side of the circuit interrupting device,
generating a voltage at a first output of the GFCI circuit when the GFCI circuit is activated,
activating a first switching device when the voltage is generated at the first output of the GFCI circuit,
conducting a low level current through a solenoid when the first switching device is activated,
generating a device turn-on signal at a second output of the GFCI circuit when the low level current is conducted through the solenoid,
deactivating the first switching device and activating a second switching when the turn-on signal is generated at the second output of the GFCI,
conducting a high level current larger than the low level current through the solenoid when the second switching device is activated, and
closing a latching mechanism when the high level current is conducted through the solenoid.

19. The method as claimed in claim 18, further comprising the steps of
conducting a net current through a sense transformer when the low level current is conducted through the solenoid, and
detecting the net current conducted through the sense transformer.

20. The method as claimed in claim 18, further comprising the steps of
activating a power on indicator when power is applied to the line side of the circuit interrupting device, and
activating an end of life indicator if the latching mechanism fails to close when the high level current is conducted through the solenoid.

* * * * *